(12) United States Patent
Miller et al.

(10) Patent No.: US 9,471,838 B2
(45) Date of Patent: Oct. 18, 2016

(54) METHOD, APPARATUS AND SYSTEM FOR PERFORMING FACIAL RECOGNITION

(75) Inventors: Trent J. Miller, West Chicago, IL (US); Tyrone D. Bekiares, Park Ridge, IL (US); Richard M. Clayton, Manorville, NY (US); Timothy J. Collins, Homer Glen, IL (US); Deborah J. Monks, Palatine, IL (US)

(73) Assignee: MOTOROLA SOLUTIONS, INC., Chicago, IL (US)

( * ) Notice: Subject to any disclaimer, the term of this patent is extended or adjusted under 35 U.S.C. 154(b) by 560 days.

(21) Appl. No.: 13/603,528

(22) Filed: Sep. 5, 2012

(65) Prior Publication Data
US 2014/0063249 A1 Mar. 6, 2014

(51) Int. Cl.
*G05B 19/00* (2006.01)
*G06K 9/00* (2006.01)
*G06F 17/30* (2006.01)

(52) U.S. Cl.
CPC ..... *G06K 9/00791* (2013.01); *G06F 17/30247* (2013.01)

(58) Field of Classification Search
None
See application file for complete search history.

(56) References Cited

U.S. PATENT DOCUMENTS

| | | | |
|---|---|---|---|
| 4,821,118 A | 4/1989 | Lafreniere | |
| 6,546,119 B2 | 4/2003 | Ciolli et al. | |
| 6,975,346 B2 | 12/2005 | Kumhyr | |
| 7,183,895 B2 | 2/2007 | Bazakos et al. | |
| 7,277,891 B2 | 10/2007 | Howard et al. | |
| 7,382,244 B1 | 6/2008 | Donovan et al. | |
| 7,786,897 B2 | 8/2010 | Alves | |
| 7,843,321 B2 | 11/2010 | Marchasin et al. | |
| 7,880,595 B2 | 2/2011 | Shimura | |
| 7,982,634 B2 | 7/2011 | Arrighetti | |
| 8,120,513 B2 | 2/2012 | Ioli | |
| 2003/0095688 A1 | 5/2003 | Kirmuss | |
| 2003/0179307 A1 | 9/2003 | Kawanishi et al. | |
| 2004/0199785 A1* | 10/2004 | Pederson | 713/200 |
| 2006/0082438 A1 | 4/2006 | Bazakos et al. | |
| 2006/0265243 A1 | 11/2006 | Racho et al. | |
| 2007/0208681 A1 | 9/2007 | Bucholz | |
| 2008/0170758 A1 | 7/2008 | Johnson et al. | |
| 2009/0245573 A1 | 10/2009 | Saptharishi et al. | |
| 2010/0229247 A1 | 9/2010 | Phipps | |
| 2011/0038512 A1* | 2/2011 | Petrou | G06F 17/30256 382/118 |
| 2011/0057816 A1 | 3/2011 | Noble et al. | |
| 2011/0128350 A1 | 6/2011 | Oliver et al. | |
| 2011/0133952 A1 | 6/2011 | McNamara et al. | |
| 2012/0161927 A1 | 6/2012 | Pierfelice et al. | |

FOREIGN PATENT DOCUMENTS

| | | |
|---|---|---|
| EP | 1486928 A2 | 12/2004 |
| WO | 2004042673 A2 | 5/2004 |
| WO | 2004042673 A3 | 5/2004 |

OTHER PUBLICATIONS

International Search Report and Written Opinion for counterpart International Patent Application No. PCT/US2013/055732 mailed Nov. 25, 2013.
Jain, A. K. et al., "Face Matching and Retrieval in Forensics Applications", IEEE Multimedia IEEE Service Center, New York, vol. 19, No. 1, Jan. 1, 2012, pp. 20-28.

* cited by examiner

*Primary Examiner* — Ojiako Nwugo

(57) ABSTRACT

A method, apparatus, and system for performing facial recognition utilizing large databases is provided herein. During operation a large database is quickly narrowed by determining an automobile attribute (e.g., a license plate number) and determining a registered owner and possibly an address based on the automobile attribute. The image database is narrowed based on the registered owner of the vehicle, and possibly the address of the registered owner.

15 Claims, 8 Drawing Sheets

| NAME | ADDRESS | IMAGE VECTOR | IMAGE |
|---|---|---|---|
| JOHN DOE | 123 MAIN | 1231234512 | JOHNDOE.JPG |
| JANE DOE | 123 MAIN | 3212344512 | JANEDOE.JPG |
| MIKE DOE | 123 MAIN | 1334322356 | MIKEDOE.JPG |
| JOE SMITH | 124 MAIN | 5421234321 | JOESMITH.JPG |

⋮

METHOD, APPARATUS AND SYSTEM FOR PERFORMING FACIAL RECOGNITION

FIELD OF THE INVENTION

The present invention generally relates to performing facial recognition, and more particularly to a method, apparatus and system for performing facial recognition utilizing large databases.

BACKGROUND OF THE INVENTION

Establishing a driver's identity is important to the safety of police officers. In many situations a driver cannot produce identification, leading to situations where extra steps need to be taken in order to confirm a person's identification. For example, drivers who can't produce a valid ID may be taken to a police station for further screening, resulting in the police officer being off the street for an extended period of time.

While facial analytics may be utilized to help identify a driver, it is impractical to take a driver's picture, and in real-time comb through millions of department of motor-vehicle (DMV) images to find a match. More particularly, for each state, there are millions of drivers and taking a picture of the driver to compare against a back-end database of millions of images is not realistic. The process of real-time identification may be improved if the massive DMV driver's license databases can somehow be reduced for searching. Therefore, a need exists for a method, apparatus, and system for performing facial recognition utilizing large databases that quickly narrows the valid set of potential drivers for a vehicle and validates an identity of a driver in real-time.

BRIEF DESCRIPTION OF THE DRAWINGS

The accompanying figures where like reference numerals refer to identical or functionally similar elements throughout the separate views, and which together with the detailed description below are incorporated in and form part of the specification, serve to further illustrate various embodiments and to explain various principles and advantages all in accordance with the present invention.

Figure 1:
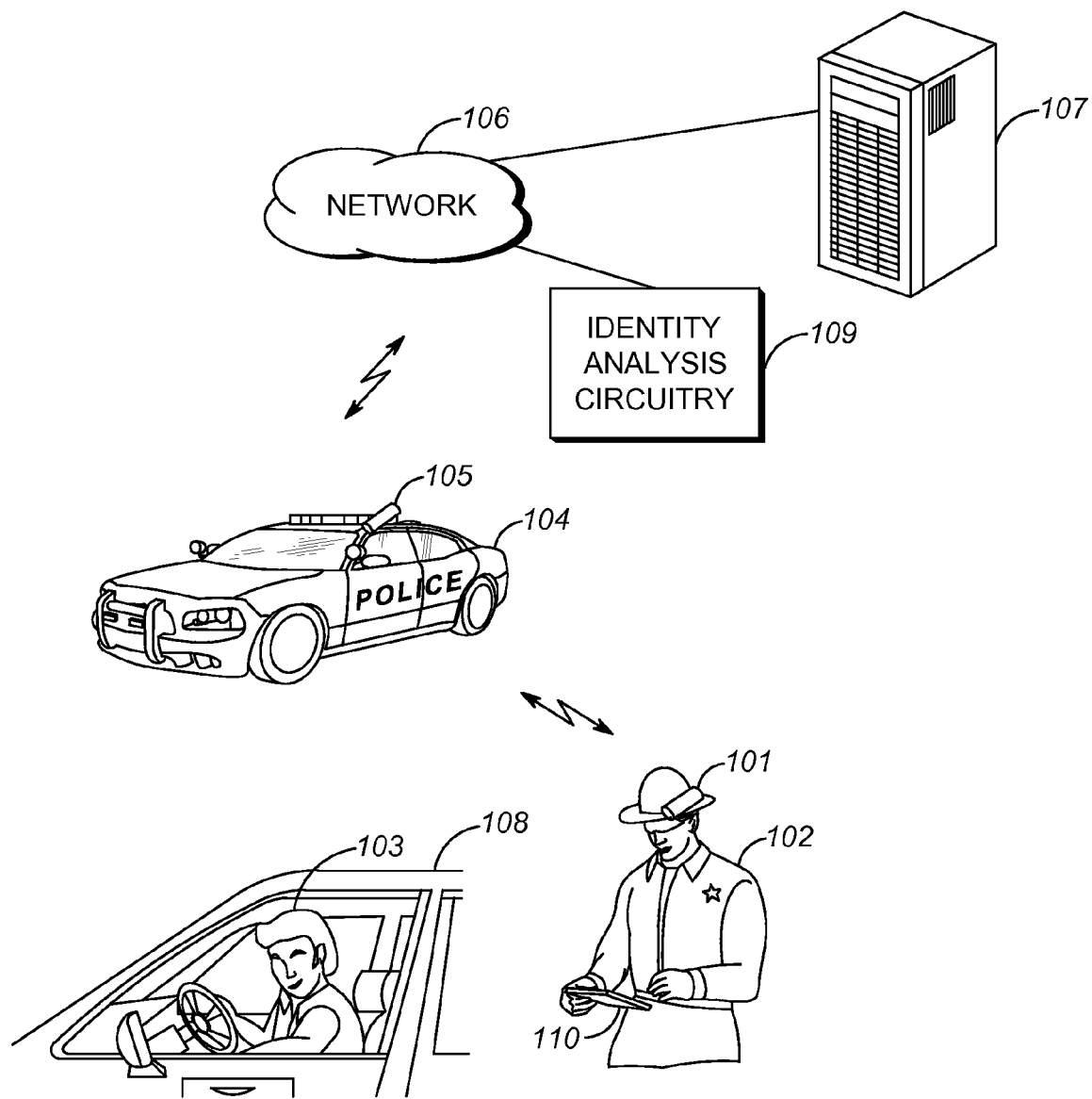
FIG. 1 illustrates a general operational environment, according to one embodiment of the present invention.

Skilled artisans will appreciate that elements in the figures are illustrated for simplicity and clarity and have not necessarily been drawn to scale. For example, the dimensions and/or relative positioning of some of the elements in the figures may be exaggerated relative to other elements to help to improve understanding of various embodiments of the present invention. Also, common but well-understood elements that are useful or necessary in a commercially feasible embodiment are often not depicted in order to facilitate a less obstructed view of these various embodiments of the present invention. It will further be appreciated that certain actions and/or steps may be described or depicted in a particular order of occurrence while those skilled in the art will understand that such specificity with respect to sequence is not actually required.

DETAILED DESCRIPTION

In order to address the above-mentioned need, a method, apparatus, and system for performing facial recognition utilizing large databases is provided herein. During operation a large database is quickly narrowed by determining an automobile attribute (e.g., a license plate number) and determining a registered owner and possibly an address based on the automobile attribute. The image database is narrowed based on the registered owner (and possibly the address) of the vehicle. For example, the narrowed database may comprise only those individuals living at the address.

If no facial-recognition match is obtained from the narrowed image database, the database is expanded to include those individuals living a predetermined distance from the address. If the individual remains unidentified, the process may be repeated by expanding the vicinity to include ever larger areas surrounding the address.

As an example, if an automobile attribute comprises a "blue Ford F150 pickup truck", multiple addresses may be determined for registered owners of blue Ford F150 pickup trucks. The determined addresses may be within a predetermined distance (e.g., 10 miles) of where the automobile was stopped by the police officer. All registered addresses for the attribute are then checked to determine individuals living at those addresses. The massive DMV image database can then be narrowed by performing facial recognition against only those individuals living at the registered addresses. It should be noted that individuals living at the registered addresses may comprise more than just the registered owner of the vehicle. For example, a family of five may be living at a registered address. All five individuals will be used to compare the user against when performing facial recognition.

If no facial-recognition match is obtained from the narrowed database, the database is expanded to include those individuals living in a vicinity of the addresses. For example, all individuals living within a block of the addresses may be determined and their images used to compare against an unidentified individual when performing facial recognition. If the individual remains unidentified, the process may be repeated by expanding the vicinity to include ever larger areas surrounding the addresses.

In yet another example, assume a police officer stopped an individual having a license plate number ILLINOIS 5867U4. If the individual is unidentified and cannot produce adequate identification, their image may be scanned and compared against individuals in the massive DMV database. In order to reduce the number of images compared to the unidentified individual a subset of the DMV database is produced. This is accomplished by determining an address for the vehicle based on the license plate number (i.e. and address of the registered owner of the vehicle). All individuals (e.g., five family members) living at that address are determined and their images are obtained. Facial recognition is then performed by comparing the unidentified individual's image against images of the five family members living at the address.

As mentioned above, if the individual remains unidentified, the process may be repeated by expanding the vicinity to include ever larger areas surrounding the address. For example, assume that the facial recognition algorithm failed to produce a match of the unidentified individual with the five family members at the address. The database for comparing the unidentified individual to may be expanded by determining all addresses within a predetermined distance from the originally obtained address. All individuals living at those addresses are determined and their images are used when attempting to identify the unidentified individual.

In yet another example, if an automobile attribute comprises a "blue Ford F150 pickup truck", multiple registered owners may be determined for blue Ford F150 pickup trucks. The determined owners may live within a predetermined distance (e.g., 10 miles) of where the automobile was stopped by the police officer. All registered owners are then used to determine social media friends of the registered owners (e.g., Facebook® friends of the owners). The massive DMV image database can then be narrowed by performing facial recognition against only social media friends of the registered owners.

By reducing the massive DMV database when performing comparisons for facial recognition, the above technique provides a real-time an achievable method for responders to establish identity for a driver without any form of identification. The above-described technique also reduces an officer's need to return to station to identify citizens with fake or no ID.

Although the above process reduced an amount of images to use for facial recognition by identifying those individuals that reside at an address, the above process may also use the following when reducing an amount of images to use:

Individuals near address—An attribute of a vehicle may be used to identify an address. An image database to search may then comprise only those images of individuals living within a predetermined distance, area, or radius of the address.

Relatives of an individual living at the address of the registered owner—An attribute of a vehicle may be used to identify an address. An image database to search may then comprise only those images of individuals that are relatives to a registered owner of the vehicle.

Individuals in same building as address—An attribute of a vehicle may be used to identify an address. An image database to search may then comprise only those images of individuals living in a same building (e.g., apartment building) as the address.

Individuals with social media relationships to vehicle owners—An attribute of a vehicle may be used to identify a registered owner and possibly their address. An image database to search may then comprise only images of those individuals having a similar social media relationship as the registered owner or those individuals living at the address. For example, all individuals that are social media friends with individuals living at the address may be identified. An image database to search may then comprise only those individuals that are social media "friends" with someone living at the address, or alternatively may comprise those individuals that are social media "friends" with the registered owner.

Individuals with criminal history with owners—An attribute of a vehicle may be used to identify an owner of the vehicle. An image database to search may then comprise only images of those individuals that have had past criminal contact with the owner. For example, an ex-boyfriend of the vehicle owner may have had a past battery charge against the owner. The ex-boyfriend will be included in the database.

FIG. 1 illustrates a general operational environment, according to one embodiment of the present invention. As shown, police officer 102 is wearing a wearable camera 101 on their hat. Camera 101 continuously provides images to police car 104 for internal storage of any image or video. This is preferably accomplished via a wireless interface to police car 104. In addition to camera 101, camera 105 is provided which is mounted on police car 104. Camera 105 also provides images to police car 104 for internal storage.

Police car 104 may be equipped with identity analysis circuitry 109 for performing facial recognition. When this is the case, the identity analysis circuitry may provide an attribute (e.g., a license plate number) to DMV database 107 via network 106. Network 106 preferably comprises a next-generation LTE trunked radio network. DMV database may return identification data (e.g., images or image vectors) of individuals. Identity analysis circuitry will then compare an image of unidentified driver 103 with those images returned by DMV database.

It should be noted that in an alternate embodiment of the present invention the DMV database (or significant portion) is on-site, either on police officer 102 or in vehicle 104. For example, a simple 32 GB flash drive may be used to store the massive DMV database.

In a second embodiment, identity analysis circuitry 109 may be located external to police car 104 and may be accessed through network 106. When this is the case, the unidentified individual's image is scanned and provided to identity analysis circuitry 109 as a digital image or an image vector. An image of the automobile attribute is also provided. Identity analysis circuitry 109 will then contact DMV database 107 and provide DMV database with the attribute, and receive images of individuals. Identification of the unidentified individual will be attempted by circuitry 109 comparing an image of the unidentified individual to the images of the individuals.

Thus, during operation, a responder 102 will stop vehicle 108. (Although vehicle 108 is shown as an automobile, one of ordinary skill in the art will recognize that in alternate embodiments vehicle 108 may comprise a boat, a motorcycle, a bus, a recreational vehicle, and the like). If driver 103 cannot be identified, camera 101 will capture an image of driver 103 and provide this image to identity analysis circuitry 109. In addition, camera 105 will capture attribute information on vehicle 108 and provide this information to identity analysis circuitry 109. Identity analysis circuitry 109 will provide the attribute information to DMV database 107 and receive images based on the attribute. For example, DMV database may determine a registered owner of the vehicle and possibly the address of the registered owner. The images provided to circuitry 109 may be:

images of individuals living at an address of the vehicle's registered owner;
images of individuals living in a predetermined area around the address;
images of relatives of an individual living at the address;
images of individuals within a same building as the address;
images of individuals within a certain radius of the address;
images of individuals with a social media relationship to the registered owner;
images of individuals with a criminal history to the registered owner; and
images of relatives of the registered owner;
images of individuals who exchange text messages with the registered owner;

images of individuals who exchange emails with the registered owner; and images of individuals who exchange calls with the registered owner.

Attribute information may comprise things such as:

a make and model of a vehicle;

a vehicle license plate number;

vehicle color, vehicle shape;

city registration identification;

vehicle identification number;

vehicle trim options and customizations;

identifying markings and defects on the vehicle, such as stickers, dents, scratches, designs, symbols, lights, special after-market equipment, broken windows, sunroof, etc.;

interior features, such as color, number of seats, etc.

Identity analysis circuitry 109 compare the image of the unidentified user to those received from DMV database 107. If a match is made, this information is provided to police officer 102 via a wireless device 110 (e.g., a laptop computer, PDA, LMR radio, wireless glasses, audible alert via PDA, LMR radio, earpiece, visual alerts, vibration alerts, . . . , etc.). If, however, a match is not made, identity analysis circuitry 109 contacts DMV database 107 and requests more images for comparison. More images to be provided may be determined by:

determining images of individuals living in a predetermined area around the registered owner's address;

determining images of relatives of an individual living at the address;

determining images of individuals within a same building as the address;

determining images of individuals within a certain radius of the address;

determining images of individuals with a social media relationship to the registered owner of the vehicle;

determining images of individuals with a criminal history to the owner of the vehicle; and/or determining images of relatives of the registered owner of the vehicle determining images of individuals who exchange text messages with the registered owner;

determining images of individuals who exchange emails with the registered owner;

determining images of individuals who exchange calls with the registered owner.

Figure 2:
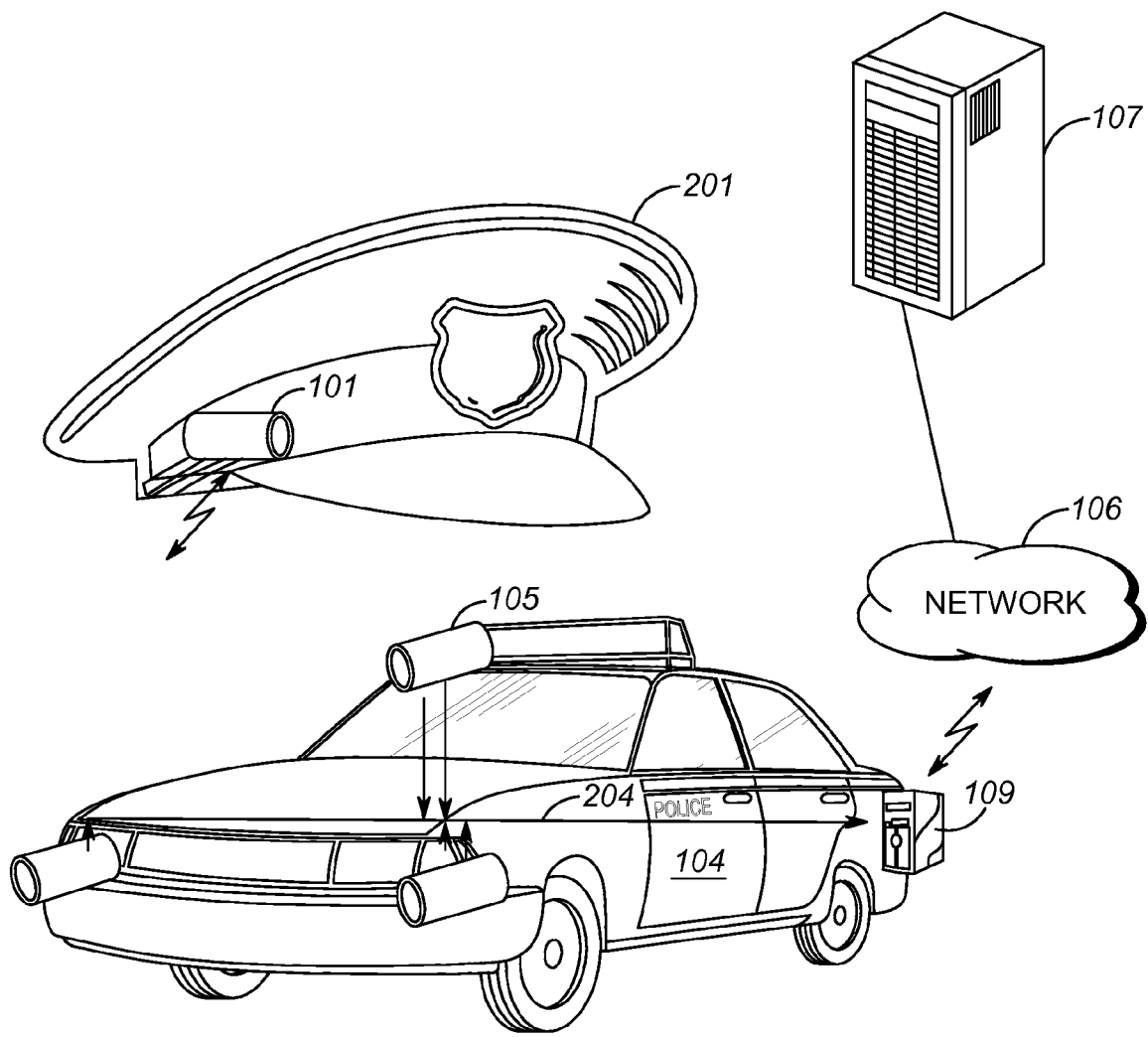
FIG. 2 shows further detail of FIG. 1.

FIG. 2 shows further detail of FIG. 1. As shown in FIG. 2, camera 101 is mounted to hat 201. Camera 101 preferably contains a wide field of view projection lens (e.g. 110 degrees) or a "fisheye" lens capable of capturing an extremely wide, hemispherical image (e.g., 180 degrees). Although camera 101 is shown mounted to hat 201, in other embodiments of the present invention camera 101 may be mounted to the shoulder or chest of a wearer or be contained in a wireless device used by the police officer 102. Camera 101 serves to capture a wide-angle image or video (e.g. 1920×1080 at 30 frames/second) of its surroundings and then output a desired portion (cropped portion, or also referred to as the desired field of view) of the captured image or video at a particular resolution (e.g., 640×480 8-bit pixels at 30 frames/second). The desired portion may then be compressed, stored, transmitted, or displayed. For example, a desired portion (e.g., a facial image) may be wirelessly transmitted to identity analysis circuitry 109. Such a camera is disclosed in U.S. patent application Ser. No. 12/627,331 and entitled METHOD AND APPARATUS FOR CHOOSING A DESIRED FIELD OF VIEW FROM A WIDE ANGLE IMAGE OR VIDEO.

As shown, police car 104 comprises a plurality of cameras 105 (only one labeled). In one embodiment one or more of the cameras are mounted upon a guidable/remotely positionable camera mounting 105. Identity analysis circuitry 109 comprises a simple computer that serves to control camera mounts 105 and to use an image analysis algorithm to identify unidentified individuals. In one embodiment, identity analysis circuitry 109 is housed in the trunk of vehicle 104. In another embodiment circuitry 109 is housed external to vehicle 104. In yet another embodiment circuitry 109 is housed in either of cameras 101 or 105.

Communication between elements existing within police car 104 may be accomplished via bus(es) 204 and/or wirelessly. Although not shown, there may comprise additional wiring such as between identity analysis circuitry 109 and camera mounts 105 in order to remotely control camera mount positioning.

Each camera 105 mounted on the vehicle is assumed to be movable and positionable under the guidance of identity analysis circuitry 109. Mount movement could be a linear motion along a single axis or multiple axes (independently or simultaneously) and/or rotary/circular motion. Such motion could trace a combination of unidirectional, reciprocating, oscillating, irregular, and intermittent paths. Movement can be accomplished through use of electric motor(s) or electromechanical actuator(s)/electromagnetic solenoid(s)/relay(s) or pneumatic/air-powered motor(s) or a hybrid of these.

Figure 3:
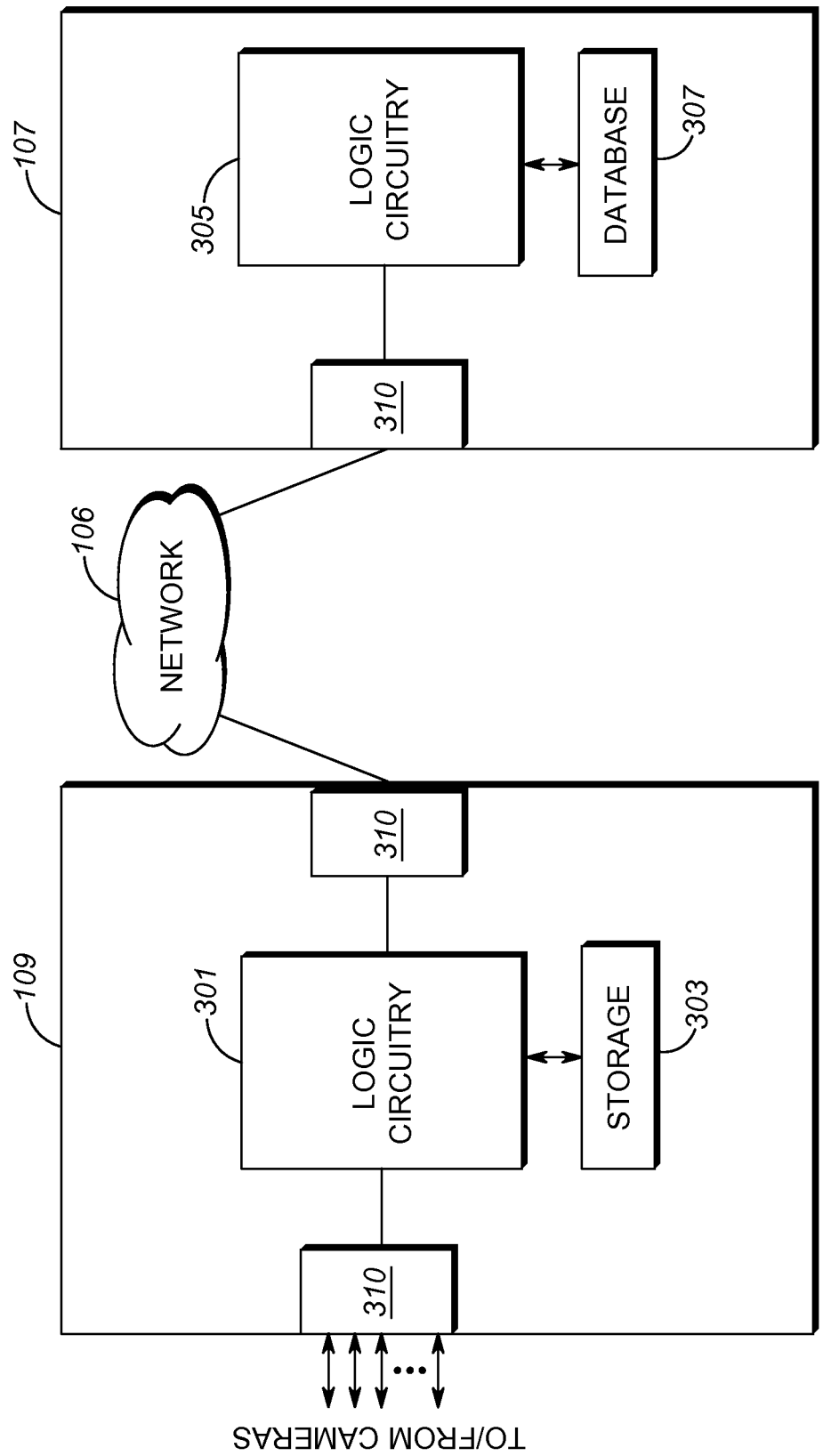
FIG. 3 is a block diagram of identity analysis circuitry and DMV database of FIG. 1 and FIG. 2.

FIG. 3 is a block diagram of identity analysis circuitry 109 and DMV database 107 of FIG. 1 and FIG. 2. It should be noted that while the functionality of circuitry 109 and DMV database 107 are shown taking place in separate entities separated by network 106, one of ordinary skill in the art will recognize that the functionality may be combined into a single device.

As shown, circuitry 109 comprises logic circuitry 301. Logic circuitry 301 comprises a digital signal processor (DSP), general purpose microprocessor, a programmable logic device, or application specific integrated circuit (ASIC) and is utilized to control and receive images from cameras 101 and 105. Storage 303 comprises standard random access memory and/or non volatile storage medias like SSD or HDD and is used to store/record video and/or facial images received from cameras 101 and 105. Storage 303 is also used to store a subset of massive database 307.

DMV database 107 comprises logic circuitry 305. Again, logic circuitry 305 comprises a digital signal processor (DSP), general purpose microprocessor, a programmable logic device, or application specific integrated circuit (ASIC) and is utilized to control and receive a vehicle attribute and determine at least one address from a vehicle attribute. From this address, logic circuitry 305 accesses database 307 to determine all individuals living at that address, or living within a predetermined distance from the determined address(es).

Database 307 comprises standard random access memory and/or non volatile storage medias like SSD or HDD and is used to store massive amounts of information on individuals and their associated residence. Images of those individuals (e.g., images of individuals) are also stored in database 307.

Both identity analysis circuitry 109 and DMV database 107 provide network interfaces 310. Where elements are connected wirelessly to the network interface 310, network interface 310 includes elements including processing, modulating, and transceiver elements that are operable in accordance with any one or more standard or proprietary wireless interfaces. Examples of network interfaces (wired or wireless) include Bluetooth, Ethernet, T1, USB interfaces, IEEE 802.11b, IEEE 802.11g, etc.

Storage 303 also serves to store an identity analysis program (not shown) that contains a set of instructions run by logic circuitry 301. During the running of these instructions an image obtained of an unidentified individual is compared to individuals stored in storage 303 in order to determine if the image of the unidentified individual matches an image of others stored in storage 303. Techniques to identify an individual from an image are commonplace and will not be discussed in detail. One of any number of image analysis techniques may be utilized without departing from the spirit and scope of the invention. For example, such software is provided by Brighthub® (see www.brighthub.com).

Figure 4:
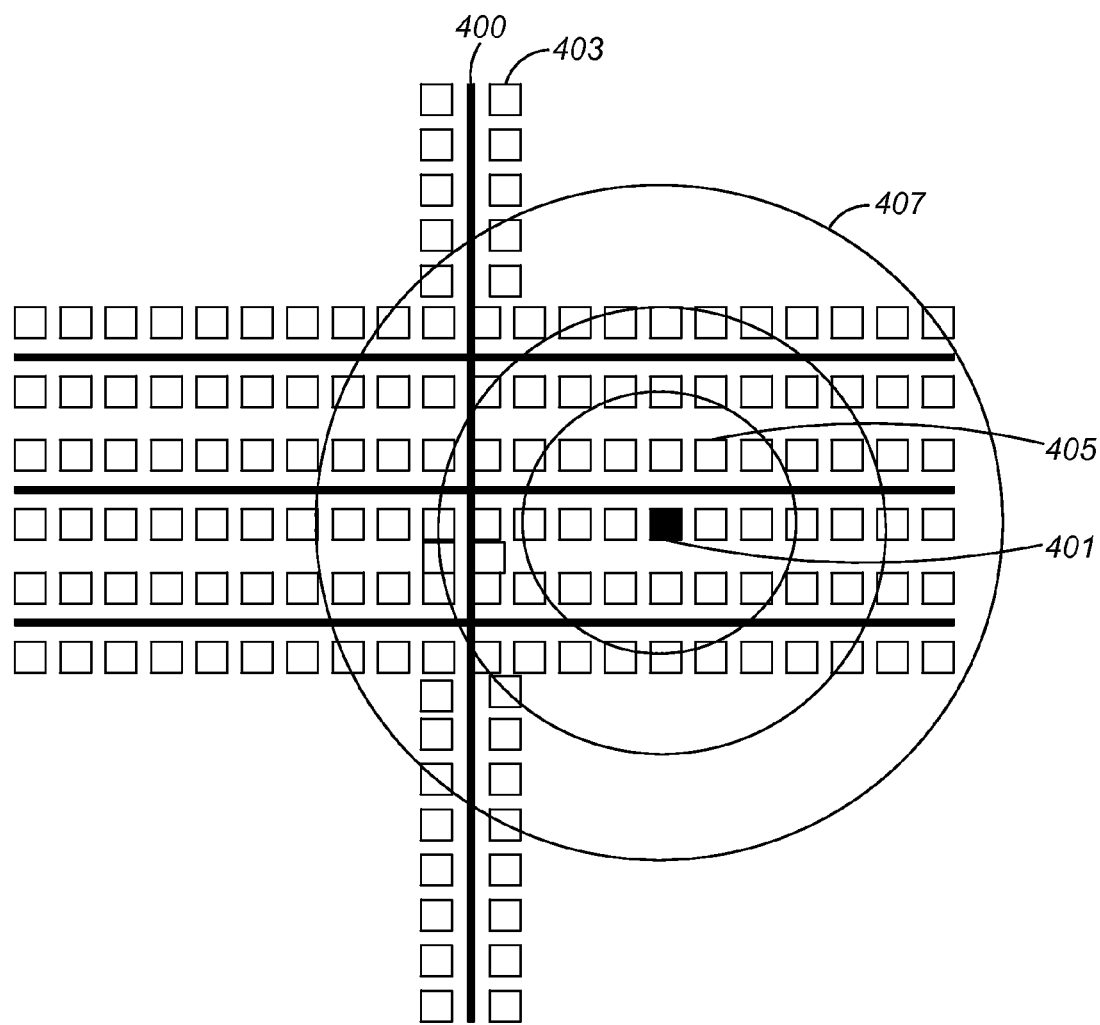
FIG. 4 illustrates searching regions.

FIG. 4 illustrates the searching of regions based on attribute information, where the DMV database is narrowed by providing images of individuals living at or near certain addresses. More particularly, FIG. 4 shows individual streets 400 (only one labeled) along with individual buildings 403 (only one labeled). During operation of logic circuitry 305, attribute information is received and an in this particular example, an address of building 401 is determined based on the attribute information. For example, an address of building 401 may have been determined as an address of a registered owner of the vehicle based on license-plate information. Thus, in one embodiment building 401 is the residence of a registered owner of a vehicle. DMV database 107 will return the identification and image information for all individuals residing in building 401.

At a later time, DMV database 107 may be notified that no individual residing at building 401 matched an identity for an unidentified person. In response, addresses for all buildings within a certain radius 405 of building 401 may be determined. Individuals living at those addresses may be determined and the identifications and images for all individuals residing in buildings within radius 405 may be provided to identification analysis circuitry 109. This process may be repeated by expanding radius to encompass all buildings within radius 407.

Figure 5:
FIG. 5 illustrates a database of addresses and names accessed by identity analysis circuitry.

FIG. 5 illustrates databases 303 and 307. As shown, these databases contain the name and address of individuals along with their image (in .jpg format). Also shown in the databases are image vectors associated with each image. These image vectors are derived from quantified, select features extracted from an image of a face, and comprise a mathematical model describing facial structure. These models are used for face recognition; a face is "recognized" if the image vector of the image of a face matches the image vector of an image of a face in the database.

It should be noted that while both database 303 and 307 contain similar information for individuals stored within them, database 303 contains relatively few entries when compared to database 307. More particularly, while database 307 may contain millions of individual names, addresses, and image information, database 307 may contain a very small subset of database 307 (e.g., information on 50 individuals).

Figure 6:
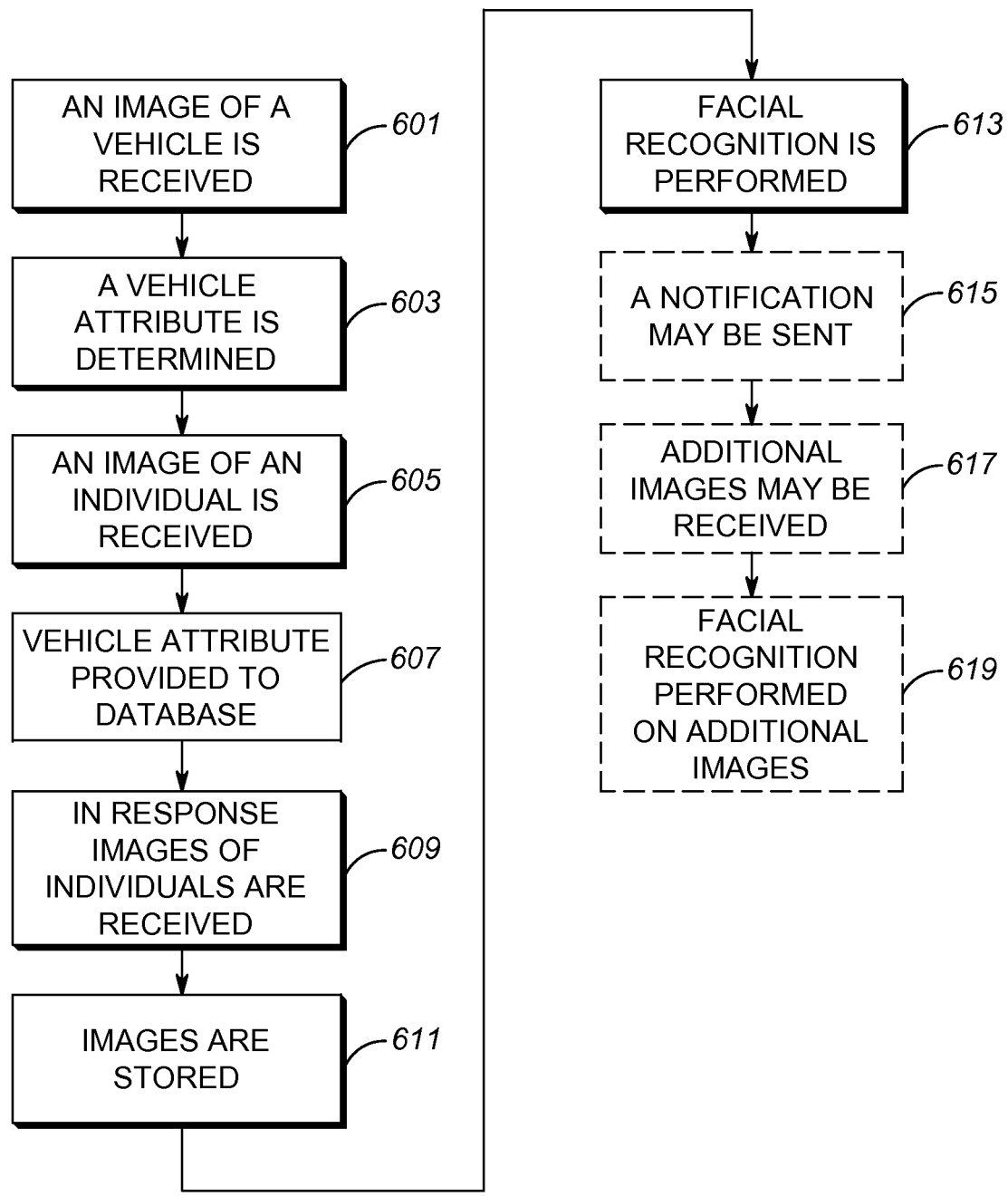
FIG. 6 is a flow chart showing operation of identity analysis circuitry.

FIG. 6 is a flow chart showing operation of identity analysis circuitry 109. The logic flow begins at step 601 where an image of a vehicle is received by network interface 310. In one embodiment, the image is acquired and received from camera 105, however in alternate embodiments the image may be acquired and received from any camera (e.g., camera 101).

At step 603 a vehicle attribute is determined by logic circuitry 301 based on the image. At step 605 an image of an individual is received via network interface 310. As discussed above, this is preferably acquired and received from camera 101, however in alternate embodiments of the present invention the image may be received via any camera (e.g., camera 105). At step 607 the vehicle attribute is provided to DMV database 107 via network interface 310. In response, images of individuals are received from database 307 based on the vehicle attribute (step 609) via interface 310 and these images are stored in storage 303 (step 611). Facial recognition is performed by logic circuitry 301 by comparing the image of the individual to the received images stored in storage 303 (step 613).

It should be noted that there may be value in the likely images and associated information (name, age, etc.) being retrieved after the car attributes have been captured, but before the image analysis is done. There may be value in the officer being presented with this information in their police vehicle before they approach the suspect vehicle. It arms the officer with information independent of any image analysis operation.

As discussed above, there may be instances where no identification is made by comparing an individual to the received images. When this is the case the following optional steps may be performed.

At step 615 a notification may be sent to DMV database 107 that identification was not made. In response to the notification additional images may be received (step 617) facial recognition may be performed on the additional images by logic circuitry 301 comparing the image of the individual to the additional images (step 619).

Figure 7:
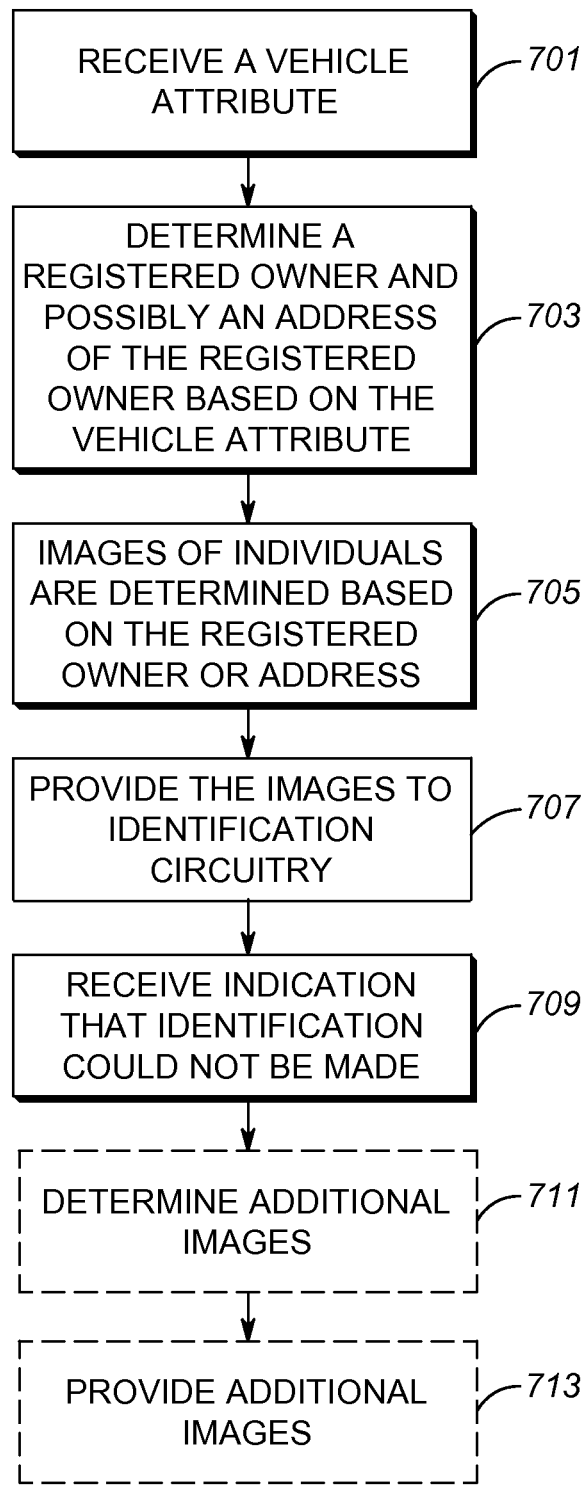
FIG. 7 is a flow chart showing operation of a DMV database.

FIG. 7 is a flow chart showing operation of DMV database 107. The logic flow begins at step 701 where interface 310 receives a vehicle attribute. In response, logic circuitry 305 determines a registered owner of the vehicle (and possibly an address of the registered owner) based on the attribute (step 703). Images of individuals are determined based on the registered owner and possibly the address of the registered owner (step 705). As discussed above, the images of the individuals comprise images of those individuals living at an address of the registered owner, living in a predetermined area around the address, living within a same building as the registered owner, living within a certain radius of the address of the registered owner, having a social media relationship to the registered owner, having a criminal history to the registered owner, and/or relatives of the registered owner.

The logic flow continues to step 707 where network interface 310 is utilized to provide the images to identification circuitry to perform facial recognition. It should be noted that during operation, other information may be determined and provided along with the images. For example, each image provided may include the name and address of the individual along with statistics such as, but not limited to, age, warrant information, gang affiliation, medical conditions (e.g., if the individual has Alzheimer's disease), etc.

As discussed above, there may exist times when no match is found between the images provided to the facial recognition circuitry and an image of a driver. When this is the case the following optional steps may be performed by DMV database 107.

At step 709 an indication that an identification could not be made may be received by interface 310 and in response, additional images of individuals may be determined based on the address of the registered owner (step 711). At step 713 these additional images may be provided to identification circuitry to perform facial recognition. As discussed above, the additional images comprise images of individuals living within a predetermined distance of the registered owner of the vehicle.

Figure 8:
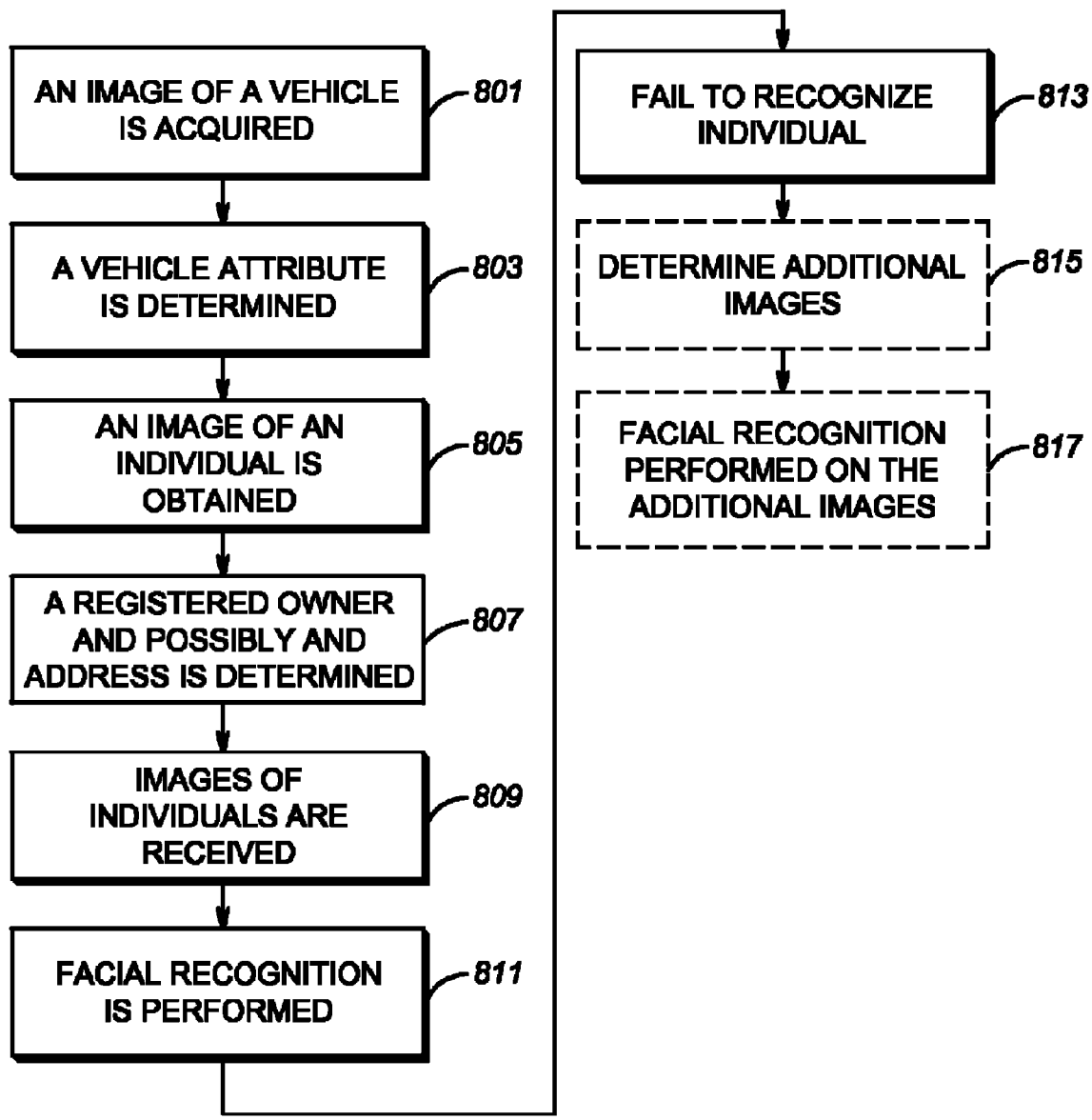
FIG. 8 is a flow chart showing operation of the system shown in FIG. 1.

FIG. 8 is a flow chart showing operation of the system shown in FIG. 1. The logic flow begins at step 801 where a camera acquires an image of a vehicle. A vehicle attribute is determined by logic circuitry 301 based on the image (step 803) and at step 805 an image of an individual is acquired by a camera. A registered owner of the vehicle is determined (and possibly an address of the registered owner is determined) based on the attribute by logic circuitry 305 (step 807) and images of individuals are determined at step 809 based on the registered owner. Finally, at step 811 facial recognition is performed by logic circuitry 301 by comparing the image of the individual to the received images.

The following optional steps may additionally be performed. Logic circuitry 301 may fail to identify the individual with the images provided (step 813). In response, additional images may be determined by logic circuitry 305 (step 815) and facial recognition may be performed on the additional images by logic circuitry 301 (step 817).

In the foregoing specification, specific embodiments have been described. However, one of ordinary skill in the art appreciates that various modifications and changes can be made without departing from the scope of the invention as set forth in the claims below. For example, although the above description was made with regards to a law-enforcement officer identifying an individual, one or ordinary skill in the art will recognize that the above identification technique may be used by any person wishing to identify an individual. For example, the above technique may be utilized by emergency medical technician (EMT) to identify, for example, an unconscious individual. Accordingly, the specification and figures are to be regarded in an illustrative rather than a restrictive sense, and all such modifications are intended to be included within the scope of present teachings.

In the above description a subset of the massive DMV database was used for facial recognition. The reduction of the database was accomplished by determining a registered owner of a vehicle from a vehicle attribute (e.g., license plate number). After the registered owner of the vehicle has been determined, the subset may be determined as, for example, relatives of the registered owner, social media friends of the registered owner, individuals with criminal records involving the registered owner, etc. In further embodiments of the present invention an address of the registered owner may be determined and the subset may be determined as, for example, individuals living at an address of a registered owner of the vehicle, individuals living in a predetermined area around the address, relatives of an individual living at the address, individuals within a same building as the address, individuals within a certain radius of the address, etc.

Those skilled in the art will further recognize that references to specific implementation embodiments such as "circuitry" may equally be accomplished via either on general purpose computing apparatus (e.g., CPU) or specialized processing apparatus (e.g., DSP) executing software instructions stored in non-transitory computer-readable memory. It will also be understood that the terms and expressions used herein have the ordinary technical meaning as is accorded to such terms and expressions by persons skilled in the technical field as set forth above except where different specific meanings have otherwise been set forth herein.

The benefits, advantages, solutions to problems, and any element(s) that may cause any benefit, advantage, or solution to occur or become more pronounced are not to be construed as a critical, required, or essential features or elements of any or all the claims. The invention is defined solely by the appended claims including any amendments made during the pendency of this application and all equivalents of those claims as issued.

Moreover in this document, relational terms such as first and second, top and bottom, and the like may be used solely to distinguish one entity or action from another entity or action without necessarily requiring or implying any actual such relationship or order between such entities or actions. The terms "comprises," "comprising," "has", "having," "includes", "including," "contains", "containing" or any other variation thereof, are intended to cover a non-exclusive inclusion, such that a process, method, article, or apparatus that comprises, has, includes, contains a list of elements does not include only those elements but may include other elements not expressly listed or inherent to such process, method, article, or apparatus. An element proceeded by "comprises . . . a", "has . . . a", "includes . . . a", "contains . . . a" does not, without more constraints, preclude the existence of additional identical elements in the process, method, article, or apparatus that comprises, has, includes, contains the element. The terms "a" and "an" are defined as one or more unless explicitly stated otherwise herein. The terms "substantially", "essentially", "approximately", "about" or any other version thereof, are defined as being close to as understood by one of ordinary skill in the art, and in one non-limiting embodiment the term is defined to be within 10%, in another embodiment within 5%, in another embodiment within 1% and in another embodiment within 0.5%. The term "coupled" as used herein is defined as connected, although not necessarily directly and not necessarily mechanically. A device or structure that is "configured" in a certain way is configured in at least that way, but may also be configured in ways that are not listed.

It will be appreciated that some embodiments may be comprised of one or more generic or specialized processors (or "processing devices") such as microprocessors, digital signal processors, customized processors and field programmable gate arrays (FPGAs) and unique stored program instructions (including both software and firmware) that control the one or more processors to implement, in conjunction with certain non-processor circuits, some, most, or all of the functions of the method and/or apparatus described herein. Alternatively, some or all functions could be implemented by a state machine that has no stored program instructions, or in one or more application specific integrated circuits (ASICs), in which each function or some combinations of certain of the functions are implemented as custom logic. Of course, a combination of the two approaches could be used.

Moreover, an embodiment can be implemented as a computer-readable storage medium having computer readable code stored thereon for programming a computer (e.g., comprising a processor) to perform a method as described and claimed herein. Examples of such computer-readable storage mediums include, but are not limited to, a hard disk, a CD-ROM, an optical storage device, a magnetic storage device, a ROM (Read Only Memory), a PROM (Programmable Read Only Memory), an EPROM (Erasable Programmable Read Only Memory), an EEPROM (Electrically Erasable Programmable Read Only Memory) and a Flash memory. Further, it is expected that one of ordinary skill, notwithstanding possibly significant effort and many design choices motivated by, for example, available time, current technology, and economic considerations, when guided by the concepts and principles disclosed herein will be readily capable of generating such software instructions and programs and ICs with minimal experimentation.

The Abstract of the Disclosure is provided to allow the reader to quickly ascertain the nature of the technical disclosure. It is submitted with the understanding that it will not be used to interpret or limit the scope or meaning of the claims. In addition, in the foregoing Detailed Description, it can be seen that various features are grouped together in various embodiments for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus the following claims are hereby incorporated into the Detailed Description, with each claim standing on its own as a separately claimed subject matter.

What is claimed is:

1. A method for performing facial recognition, the method comprising the steps of:
   acquiring an image of a vehicle;
   determining a vehicle attribute based on the image;
   acquiring an image of an individual;
   providing the vehicle attribute to a database;
   receiving images of multiple differing individuals from the database based on the vehicle attribute;
   performing facial recognition by comparing the image of the individual to the received images of multiple differing individuals;
   sending a notification that an identification was not made;
   determining individuals living within a predetermined distance from the registered owner of the vehicle; and
   receiving additional images in response to the notification, wherein the additional images are the individuals living within the predetermined distance from the registered owner of the vehicle.

2. The method of claim 1 wherein the vehicle attribute comprises an attribute taken from the group consisting of:
   a make and model of the vehicle;
   the vehicle license plate number;
   city registration identification,
   vehicle identification number;
   vehicle trim options and customizations;
   vehicle color;
   the vehicle shape;
   identifying markings and defects on the vehicle; and
   interior features of the vehicle.

3. The method of claim 1 wherein the images of multiple differing individuals are taken from the group consisting of:
   images of individuals living at an address of a registered owner of the vehicle;
   images of individuals living in a predetermined area around the address;
   images of relatives of an individual living at the address;
   images of individuals within a same building as the address;
   images of individuals within a certain radius of the address;
   images of individuals with a social media relationship to the registered owner(s);
   images of individuals with a criminal history with the registered owner;
   images of relatives of the registered owner;
   images of individuals who exchange text messages with the registered owner;
   images of individuals who exchange emails with the registered owner; and
   images of individuals who exchange calls with the registered owner.

4. The method of claim 1 wherein the additional images comprise images of individuals living a certain distance from the registered owner.

5. The method of claim 1 wherein the additional images comprise images of individuals related to the registered owner.

6. A method for performing facial recognition, the method comprising the steps of:
   receiving a vehicle attribute;
   determining a registered owner of the vehicle based on the attribute;
   determining images of multiple differing individuals based on the registered owner;
   providing the images of multiple differing individuals to identification circuitry to perform facial recognition;
   receiving a notification that an identification was not made; and
   determining individuals living a within predetermined distance from the registered owner
of the vehicle;
   providing additional images of the individuals living within the predetermined distance from the registered owner of the vehicle in response to the notification.

7. The method of claim 6 wherein the step of determining the images of multiple differing individuals comprises the step of performing one or more of the following:
   determining images of individuals living at an address of the registered owner;
   determining images of individuals living in a predetermined area around the address;
   determining images of relatives of an individual living at the address;
   determining images of individuals within a same building as the address;
   determining images of individuals within a certain radius of the address;
   determining images of individuals with a social media relationship to the registered owner of the vehicle;
   determining images of individuals with a criminal history to registered owner;
   and/or determining images of relatives of the registered owner;
   determining images of individuals who exchange text messages with the registered owner;
   determining images of individuals who exchange emails with the registered owner; and
   determining images of individuals who exchange calls with the registered owner.

8. The method of claim 6 wherein the vehicle attribute comprises an attribute taken from the group consisting of:
   a make and model of the vehicle;
   the vehicle license plate number;
   city registration identification,
   vehicle identification number;
   vehicle trim options and customizations;
   vehicle color;
   the vehicle shape;
   identifying markings and defects on the vehicle; and
   interior features of the vehicle.

9. The method of claim 6 wherein the additional images comprise images of individuals living a certain distance from the registered owner.

10. The method of claim 6 wherein the additional images comprise images of individuals related to the registered owner.

11. A method for performing facial recognition, the method comprising the steps of:
- acquiring an image of a vehicle determining a vehicle attribute based on the image;
- acquiring an image of an individual;
- determining a registered owner of the vehicle based on the attribute;
- determining images of multiple differing individuals based on the registered owner;
- performing facial recognition by comparing the image of the individual to the images of the multiple differing individuals;
- sending a notification that an identification was not made; and
- determining relatives of the registered owner of the vehicle;
- receiving additional images of the relatives of the registered owner of the vehicle in response to the notification.

12. The method of claim 11 wherein the vehicle attribute comprises an attribute taken from the group consisting of:
- a make and model of the vehicle;
- the vehicle license plate number;
- city registration identification,
- vehicle identification number;
- vehicle trim options and customizations;
- vehicle color;
- the vehicle shape;
- identifying markings and defects on the vehicle; and
- interior features of the vehicle.

13. The method of claim 11 wherein the step of determining images of multiple differing individuals comprises the step of performing one or more of the following:
- determining images of individuals living at an address of the registered owner;
- determining images of individuals living in a predetermined area around the address;
- determining images of relatives of an individual living at the address;
- determining images of individuals within a same building as the address;
- determining images of individuals within a certain radius of the address;
- determining images of individuals with a social media relationship to the registered owner of the vehicle;
- determining images of individuals with a criminal history to registered owner; and/or
- determining images of relatives of the registered owner.
- determining images of individuals who exchange text messages with the registered owner;
- determining images of individuals who exchange emails with the registered owner; and
- determining images of individuals who exchange calls with the registered owner.

14. The method of claim 11 wherein the additional images comprise images of individuals living a certain distance from the registered owner.

15. The method of claim 11 wherein the additional images comprise images of individuals related to the registered owner.

\* \* \* \* \*